US012747045B2

(12) United States Patent
Dayan et al.

(10) Patent No.: US 12,747,045 B2
(45) Date of Patent: Sep. 29, 2026

(54) UNMANNED AERIAL VEHICLE SYSTEM INCLUDING FOLDABLE UNMANNED AERIAL VEHICLE

(71) Applicant: Easy Aerial Inc., Brooklyn, NY (US)

(72) Inventors: Omri Dayan, Brooklyn, NY (US); Ido Gur, San Diego, CA (US)

(73) Assignee: EASY AERIAL INC., Brooklyn, NY (US)

( * ) Notice: Subject to any disclaimer, the term of this patent is extended or adjusted under 35 U.S.C. 154(b) by 0 days.

(21) Appl. No.: 18/411,658

(22) Filed: Jan. 12, 2024

(65) Prior Publication Data

US 2024/0391616 A1 Nov. 28, 2024

Related U.S. Application Data

(60) Provisional application No. 63/438,875, filed on Jan. 13, 2023.

(51) Int. Cl.
*B64U 80/70* (2023.01)
*B64U 70/90* (2023.01)

(52) U.S. Cl.
CPC ............. *B64U 80/70* (2023.01); *B64U 70/90* (2023.01)

(58) Field of Classification Search
CPC ................................ B64U 80/70; B64U 70/92
See application file for complete search history.

(56) References Cited

U.S. PATENT DOCUMENTS

| | | | | |
|---|---|---|---|---|
| 9,545,991 | B1 * | 1/2017 | Alley | B64C 3/54 |
| 11,220,335 | B1 | 1/2022 | Felder et al. | |
| 11,673,690 | B2 | 6/2023 | Dayan et al. | |
| 11,747,832 | B2 | 9/2023 | Dayan et al. | |
| 12,017,809 | B1 * | 6/2024 | Bao | B64U 10/14 |
| 2010/0051741 | A1 * | 3/2010 | Ismailov | B64U 30/12 244/54 |
| 2011/0168838 | A1 * | 7/2011 | Hornback | F41F 3/042 244/63 |
| 2016/0257426 | A1 * | 9/2016 | Mozer | B64F 1/362 |
| 2018/0148170 | A1 * | 5/2018 | Stamatovski | B64U 80/25 |
| 2019/0023374 | A1 * | 1/2019 | Kahlon | B64U 30/12 |
| 2019/0308724 | A1 * | 10/2019 | Cooper | B64U 80/25 |
| 2020/0079492 | A1 * | 3/2020 | Noskowicz | B64U 10/25 |

(Continued)

FOREIGN PATENT DOCUMENTS

CN 108698709 A * 10/2018 .............. B60L 53/14

*Primary Examiner* — Christopher P Ellis
(74) *Attorney, Agent, or Firm* — Carter, DeLuca & Farrell, LLP

(57) ABSTRACT

An unmanned aerial vehicle system includes an unmanned aerial vehicle (UAV) and a ground station. The UAV folds from a first position in which the UAV defines a first expanse for flying to a second position in which the UAV defines a second expanse that is smaller than the first expanse for facilitating storage of the UAV. The ground station includes a box assembly and a landing pad assembly. The box assembly defines a storage cavity for storing the UAV when the UAV is disposed in the second position. The first expanse is larger than the storage cavity can accommodate. The landing pad assembly is movably coupled to the box assembly. The landing pad assembly is movable in a first direction to cause the UAV to fold into the storage cavity for storing the unmanned aerial vehicle within the box assembly.

20 Claims, 9 Drawing Sheets

(56) References Cited

U.S. PATENT DOCUMENTS

| | | | | |
|---|---|---|---|---|
| 2021/0070468 A1* | 3/2021 | Svirsky | B64U 80/25 | |
| 2021/0107620 A1* | 4/2021 | Weekes | B64C 29/0025 | |
| 2021/0300591 A1* | 9/2021 | Tian | B64F 1/007 | |
| 2022/0001975 A1* | 1/2022 | Cracknell | A45F 3/06 | |
| 2023/0174218 A1* | 6/2023 | Alexandroni | B64C 5/12 | 244/49 |
| 2024/0010368 A1* | 1/2024 | Liao | B64U 80/10 | |
| 2025/0026509 A1* | 1/2025 | Infanti | B64U 70/50 | |

* cited by examiner

UNMANNED AERIAL VEHICLE SYSTEM INCLUDING FOLDABLE UNMANNED AERIAL VEHICLE

CROSS-REFERENCE TO RELATED APPLICATIONS

This application claims the benefit of U.S. Patent Application Ser. No. 63/438,875, filed Jan. 13, 2023, the entire contents of which are hereby incorporated by reference.

TECHNICAL FIELD

This disclosure relates to aircraft, and more particularly, to unmanned aerial vehicles and operable ground stations for unmanned aerial vehicles that house, charge, deploy, and/or control unmanned aerial vehicles.

BACKGROUND

Currently, aircraft vehicles such as unmanned aerial vehicles including vertical takeoff and landing (VTOL)/fixed wing vehicles come in many different arrangements. However, the core design features of such vehicles include vertically oriented rotors, familiar to drones, and a fixed horizontal wing, familiar to airplanes. A long/wide wing is required to provide adequate lift needed for flight. While in flight, the long wing is also advantageous for facilitating flight, but the expanse of such long wings heightens the challenges associated with storing and/or transporting the vehicle on the ground. The tail length and the rotor expanse of such aircraft can also add to these storing and transporting challenges.

SUMMARY

This disclosure describes systems, devices, and methods that enable unmanned aerial vehicles with long wings, long tails, and/or expansive rotors to land and be stored inside a grounding station (e.g., a grounding station box) having dimensions smaller than the expanse of such unmanned aerial vehicles and/or the components thereof. The disclosed unmanned aerial vehicles include passive folding mechanisms for rotors, wings, and/or tails that are actuated externally by closing the ground station (e.g., a landing pad assembly and/or a hatch/door assembly of the ground station) so that the ground station, which may be in the form of a ground station box, functions as a hangar and/or a storage platform for the unmanned aerial vehicles.

Advantageously, with mechanically simple and light weight folding mechanisms built into the unmanned aerial vehicles, the unmanned aerial vehicles can fold from a first configuration in which the unmanned aerial vehicle is fully unfolded and can deploy (e.g., take flight), into a second configuration in which the unmanned aerial vehicle is smaller (e.g., has a smaller expanse compared to the first configuration of the unmanned aerial vehicle), in response to a closing motion of the landing pad assembly and/or the door assembly of the ground station so that the unmanned aerial vehicle can fit within a storage area of the ground station, which has smaller dimensions/expanse/area than the unmanned aerial vehicle when the unmanned aerial vehicle is in the first configuration. The folding mechanisms for the wings and/or tail of the unmanned aerial vehicle can include springs (e.g., torsion and/or leaf springs) to enable the unmanned aerial vehicle to automatically unfold back to the first configuration when the door assembly and/or the landing pad assembly opens. These folding mechanisms enable the unmanned aerial vehicle to maintain a fixed wing/tail in the first configuration for flight, with the blades of the rotors remaining in their unfolded configuration to facilitate vertical movement of the unmanned aerial vehicle in such flight, so that the unmanned aerial vehicle can function as a VTOL/fixed wing drone for flying further, for longer periods of time, and for landing and storage within the storage area of the grounding station (e.g., a compact box) that has a smaller expanse than the wings, the tail, and the rotors when each is in their respective second configurations in which they are unfolded or extend relative to a center of a body of the unmanned aerial vehicle and/or relative to one another.

Aviation history includes airplane designs in which wing arrangements change to reduce the ground footprint of the vehicle. The wing can contain active electromechanical actuation structure that controls an orientation of the wing, switching between a folded orientation for storage, and an unfolded orientation needed for flight. In some cases, a person is required to manually actuate/fold the wing, and a spring-loaded mechanism is deployed to unfold the wing in preparation for flight. In all cases, automatic control is internal to the wing, or manual control external to the vehicle is required to ready the vehicle for storage and travel, and return it to a flight ready state.

When designing an unmanned aerial vehicle, such as a VTOL, to fit in a ground station (e.g., a compact box), such design is typically bound by the dimensions of the storage area defined within the ground station. In the case of unmanned aerial vehicles such as VTOL/fixed wing drones, the challenge is compounded by the presence of vertical rotors with expansive propellers. Typically, vertical rotors on drones (e.g., quadcopters, etc.) have fixed diameter propellers. Occasionally, folding propellers are deployed to address the same issue that is present in traditional fixed wing aircraft to reduce the ground/storage footprint of the vehicle. Drone-based folding props are entirely passive and require a manual external control to fold them properly for storage.

This disclosure describes structure that enables different parts of the unmanned aerial vehicle to be folded so that the structure of the unmanned aerial vehicle is not bound by the confines of the storage area of the ground station, but can be configured to fit within the confines of the storage area of the ground station even when components of the unmanned aerial vehicle extend beyond the periphery of the storage area of the storage area of the ground station.

Drag on an aircraft vehicle scales with the square of the flight velocity of the vehicle. Thus, the slower the vehicle's flight velocity, the more efficient the vehicle is, and the longer the flight range. With a higher lift coefficient, the vehicle can fly slower such that for a given speed, the vehicle can produce more lift. However, considering a free body diagram of an aircraft vehicle (e.g., airplanes, unmanned aerial vehicles, etc.), the lift caused by the wings creates a moment about the center of gravity of the vehicle. The higher the lift coefficient, the greater the moment. To counteract that moment, such vehicles have tails with smaller "wings" to create a moment against the moment created by the wing. Moment is a product of the force and the distance from the pivot point. By enabling the tail of the vehicle to fold, the vehicle can include a tail section that is farther away from the pivot point than can be achieved with a fixed tail bounded by the area of the box. In turn, the tail can create a larger anti-moment to the one created by the wings, which enables a wing to be utilized that creates a large moment itself. That large moment results from a wing with high lift coefficient. The high lift coefficient means the wing produces greater lift, or more force at some distance from the pivot point, creating a large moment. To counteract the large moment, the folding tail can be disposed farther away from the pivot point. And, again, that higher lift coefficient enables slower flight speeds, less drag, longer flight ranges, and general efficiency improvement.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative aspects, in which the principles of the technology are utilized, and the accompanying figures of which.

Figure 1:
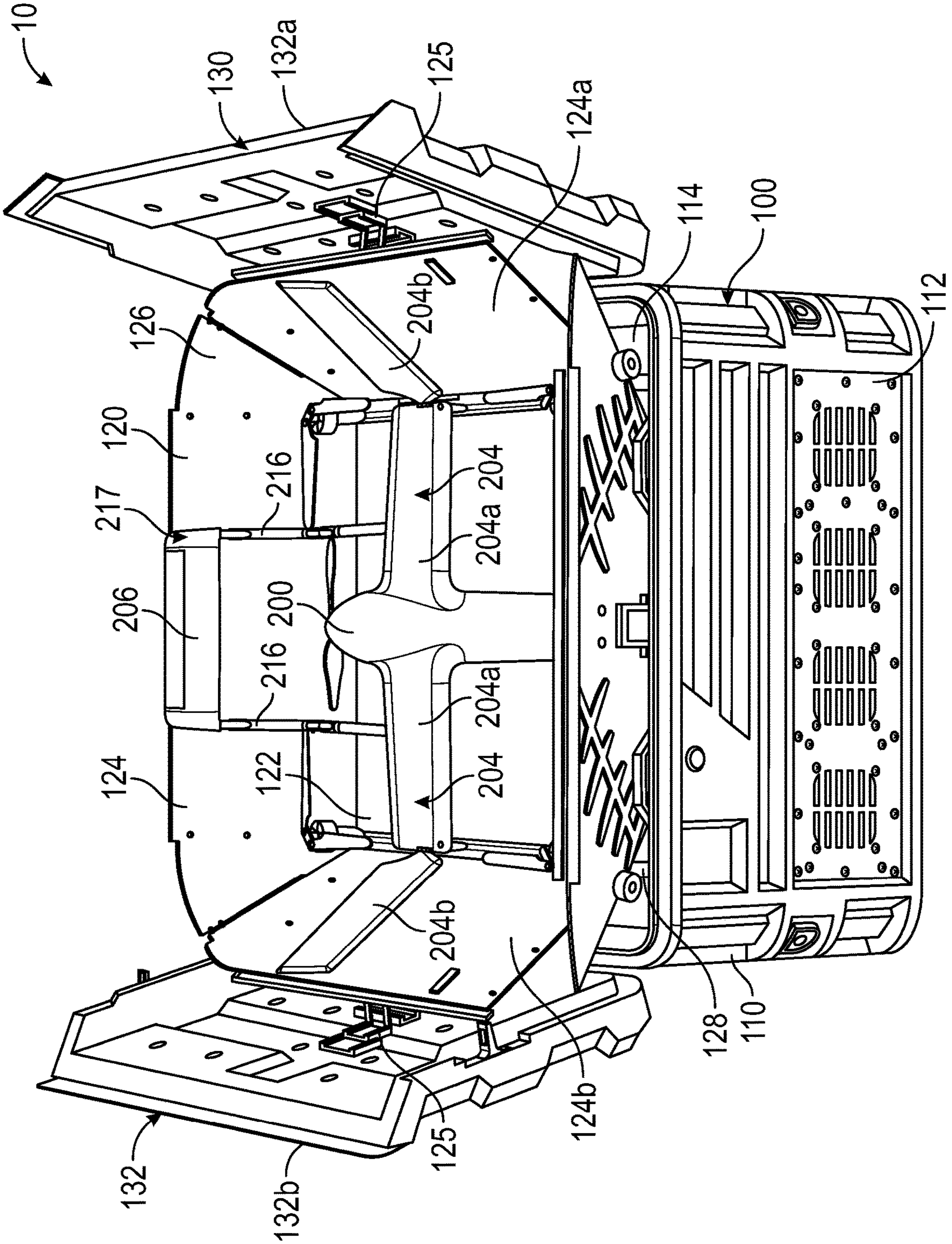
FIG. 1 is a perspective view of an unmanned aerial vehicle system in accordance with the principles of this disclosure, the unmanned aerial vehicle system including a ground station and a foldable unmanned aerial vehicle.

Further details and aspects of exemplary aspects of the disclosure are described in more detail below with reference to the appended figures. Any of the above aspects and aspects of the disclosure may be combined without departing from the scope of the disclosure.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, which would occur to one skilled in the relevant art and having possession of this disclosure, are to be considered within the scope of this disclosure.

In the following description, well-known functions or constructions are not described in detail to avoid obscuring the present disclosure in unnecessary detail.

Generally, this disclosure is directed to systems, apparatus, and methods that provide a multipurpose ground station (e.g., drone-in-a-box) with a landing platform in the form of a landing pad assembly that is movable between extended and collapsed positions to enable foldable unmanned aerial vehicles (fUAV) to be folded by, housed within, charged, deployed from (when autonomously unfolded), and/or controlled (e.g., autonomously), etc. by the ground station. Such fUAV systems may be tethered, non-tethered, and/or continuous flight drone systems.

In aspects, the landing pad assembly of the disclosed ground station is configured to center the fUAV automatically and passively upon closing the ground station. The ground station can be rugged, military grade, and ultra-portable. In aspects, size of the ground station may be different than the fUAV that the ground station houses (e.g., larger and/or smaller than one or more components of the fUAV). These characteristics enable integration of a drone-in-a-box platform into unmanned ground vehicles, which have limited space.

Briefly, the disclosed ground station is configurable to house any number or type of unmanned aerial vehicles (UAVs) including fUAVs and may house any number or type of platforms such as a) tethered UAVs and tethered fUAVs b) tethered mechanisms for such UAVs and/or fUAVs, c) non-tethered UAVs or fUAVs, and/or d) continuous flight systems enabled by housing multiple UAVs and/or fUAVs inside the same ground station. The proposed solution is configurable to store, charge, deploy and autonomously operate UAVs and fUAVs of these types within the same sized, ultra-portable, ruggedized, and military grade ground station.

For a more detailed discussion of related UAV and/or ground station systems, apparatus, and methods; one or more components and/or steps of which can be utilized or modified for use in the disclosed systems, apparatus, and/or methods; reference may be made, for example, to U.S. Pat. No. 11,220,335, issued Jan. 11, 2022; U.S. Pat. No. 11,673,690, issued Jun. 13, 2023; and U.S. Pat. No. 11,747,832, issued Sep. 5, 2023; the entire contents of each of which are incorporated herein by reference.

With reference to FIGS. 1-10, the disclosed unmanned aerial vehicle system is generally referred to as 10 and includes a ground station 100 (e.g., ground station box) and a foldable unmanned aerial vehicle (fUAV) 200.

As seen in FIGS. 1-6, the ground station 100 includes a box assembly 110, a landing pad assembly 120 movably supported in box assembly 110, and a hatch assembly 130 movably coupled to the landing pad assembly 120 and the box assembly 110.

The box assembly 110 of the ground station 100 includes outer box walls 112 and a frame assembly 114 supported within the outer box walls 112 for supporting the landing pad assembly 120.

The hatch assembly 130 of the ground station 100 includes doors 132 (e.g., a first door 132*a* and a second door 132*b*) that cooperate with one another and are movable between open and closed positions, wherein when the doors 132 are closed, the ground station 100 defines an internal storage cavity that has sufficient volume for storing the fUAV 200 therein when the fUAV 200 is disposed in a folded configuration or position, but insufficient volume for storing the fUAV 200 therein when the fUAV 200 is in an unfolded configuration or position.

The landing pad assembly 120 of ground station 100 includes a landing pad 122, four rigid auxiliary panels 124, four hinged corner panels 126, and actuators 128 that are interconnected and cooperate to enable landing pad assembly 120 to move between collapsed and extended positions. Two of the auxiliary panels 124 of landing pad assembly 120, namely first and second panels 124*a*, 124*b*, are connected to first and second doors 132*a*, 132*b* of hatch assembly 130 that enclose and cover box assembly 110 of ground station 100 via hinge assemblies 125 mounted to upper portions of the outer surface of the respective first and second panels 124*a*, 124*b*.

Actuators 128 of landing pad assembly 120 are mounted to frame assembly 114 of box assembly 110 and are movable between a retracted position and an extended position to move landing pad assembly 120 between collapsed and extended positions. In the collapsed position, landing pad assembly 120 is disposed within a periphery of box assembly 110 such that auxiliary panels 124 and corner panels 126 are parallel to a centerline "CL" extending through the ground station 100 from a top portion thereof to a bottom portion thereof (see FIG. 3). In the extended position, auxiliary panels 124 and corner panels 126 of landing pad assembly 120 extend outwardly beyond the periphery of box assembly 110 such that auxiliary panels 124 and corner panels are disposed transverse to the centerline "CL" of ground station 100. Actuators 128 effectuate a vertical motion of landing pad 122 causing auxiliary panels 124 to pivot about hinge pins (not shown) to enable auxiliary panels 124 and corner panels 126 to move to between their respective extended or retracted/collapsed positions, which also causes first door 132*a* and second door 132*b* to move between open and closed positions via hinge assemblies 125.

As can be appreciated, a controller (not explicitly shown) can be in communication with the various components of the disclosed system such as actuator 128 (e.g., via a motor) to cause actuator 128 to operate for effectuating the opening and/or closing of ground station 100 and/or components thereof.

Figure 3:
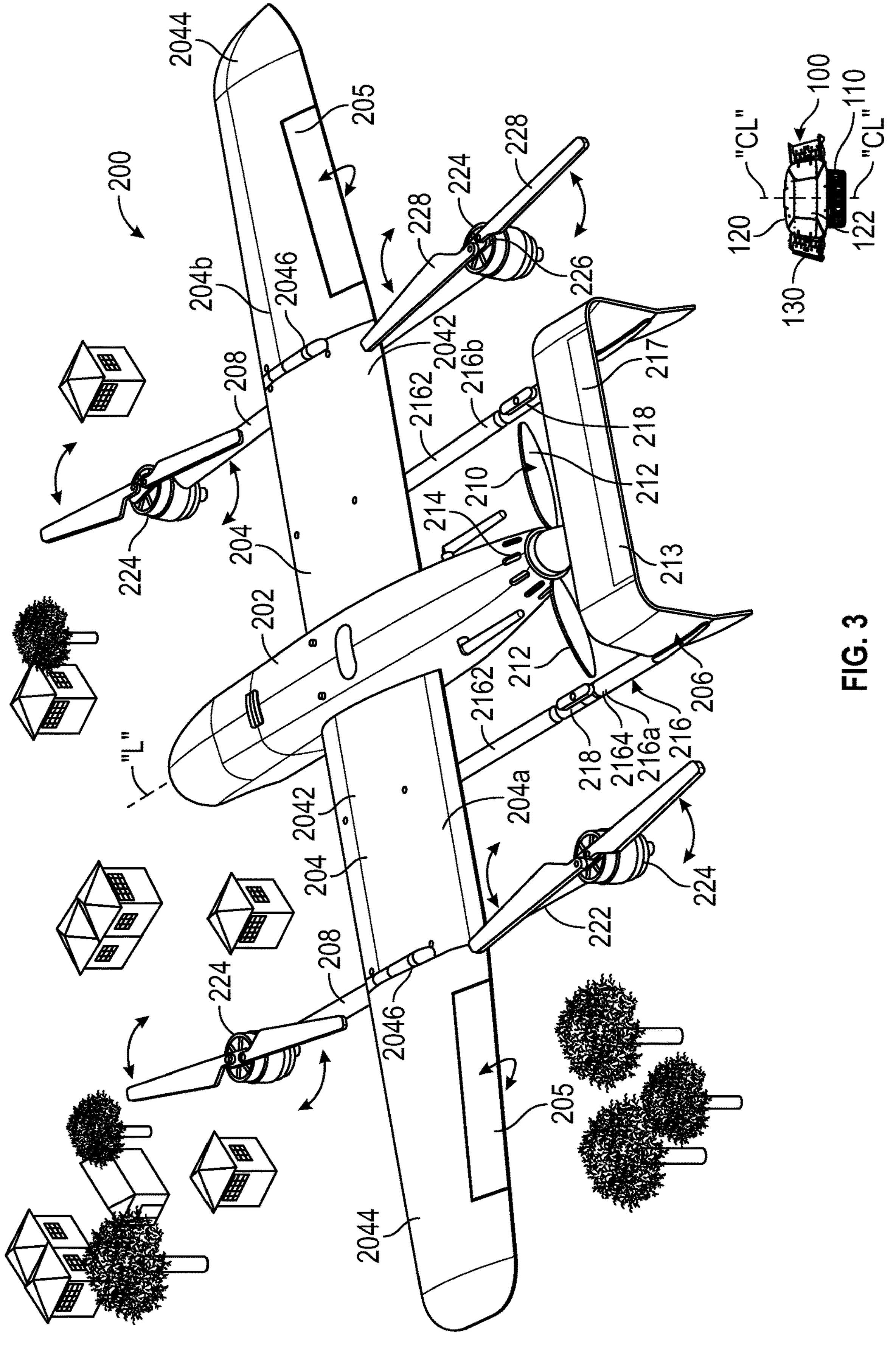
FIG. 3 is a perspective view illustrating the foldable unmanned aerial vehicle flying above the ground station over various buildings and trees.

As best seen in FIG. 3, fUAV 200 includes a body 202 defining a longitudinal axis "L", wings 204 extending from the body 202 in a direction transverse to the longitudinal axis "L" of the body 202, a tail assembly 206 extending from a trailing end of the wings 204 and proximal to the body 202, and rotor assemblies 208 coupled to the wings 204.

The body 202 of the fUAV 200 supports a propeller assembly 210 on a trailing end of the body 202. The propeller assembly 210 includes propellers 212 that extend in a direction transverse to the trail end of the body and are rotatable by a propeller motor 214 supported in the body 202 to generate propulsive force for creating thrust. The fUAV 200, like most UAVs, can support any suitable drive assembly including for instance a power source (e.g., rechargeable battery, fuel cell, solar panel, etc.) and electronics for operating fUAV 200 (e.g., propeller motor 214) or components thereof. The fUAV 200 may also include electronic devices or circuits for generating, transmitting, and/or receiving data, etc. For instance, fUAV 200 may support computing devices (e.g., controllers, processors, chips), communication devices (e.g., antenna, microphone, etc.), data capturing devices (e.g., cameras, global positioning devices, etc.), or the like. Any of the foregoing structures may be supported, for instance, in or coupled to the body 202 (or any other component of fUAV 200).

The wings 204 of the fUAV 200, which include a first wing 204*a* extending from a first side of the body 202 and a second wing 204*b* disposed in mirrored relation to the first wing 204*a* and extending from a second side of the body 202. Each of the wings 204 includes a fixed portion 2042 and a movable portion 2044 movably coupled to the fixed portion 2042. The fixed portion 2042 includes a first end coupled to the body 202 and a second end coupled to the movable portion 2044 by a wing folding mechanism. The wing folding mechanism includes a spring assembly 2046 that enables the movable portion 2044 to move between an unfolded position in which the movable portion 2044 may be aligned in the same plane as the fixed portion 2042 for lengthening an expanse of the wings 204 to increase lift and facilitate flying (FIG. 3), and a folded position in which the movable portion 2044 is disposed traverse to the fixed portion 2042 for shortening the expanse of the wings 204 (e.g., the width of the fUAV 200) and facilitating storage (FIG. 7) of the fUAV 200 within the ground station 100. More specifically, movement from the unfolded position toward the folded position is toward the longitudinal axis of the body 202. Notably, the wings 204, or portions thereof (e.g., the movable portions 2044) also include flaps 205 that are movable relative to the movable portion 2044 via actuators 205*a* (see FIG. 7), for instance to facilitate lift and/or to facilitate roll, pitch, and/or yaw of the fUAV 200. Wings 204 can additionally and/or alternatively include ailerons and/or spoilers.

Figure 8:
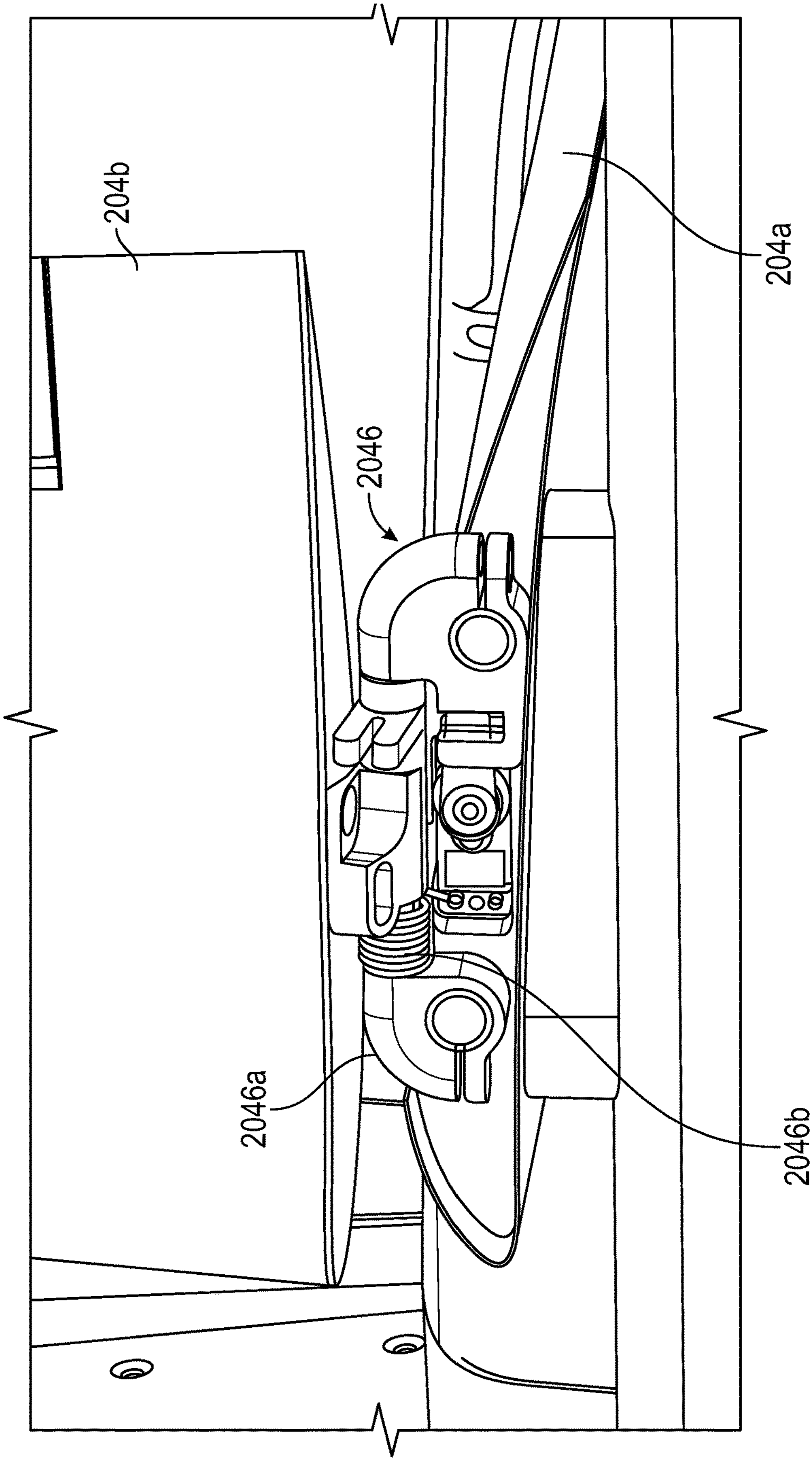
FIG. 8 is an enlarged perspective view illustrating a wing folding mechanism of the foldable unmanned aerial vehicle when the foldable unmanned aerial vehicle is folded within the storage cavity of the ground station.

As seen in FIG. 8, the spring assembly 2046 includes a pivot assembly 2046*a* that pivotably mounts the movable portion 2044 to the fixed portion, and a spring 2046*b* coupled to the pivot assembly 2046 to urge the movable portion 2044 toward the unfolded position. The spring 2046*b* is shown as a torsion spring, but any suitable spring may be used (e.g., a leaf spring).

Referring to FIGS. 3 and 8, the tail assembly 206 of the fUAV 200 includes arm assemblies 216, which includes a first arm assembly 216*a* and a second arm assembly 216*b*, and a tail 213 that connects the first arm assembly 216*a* to the second arm assembly 216*b*. Each arm assembly includes a fixed portion 2162 and a movable portion 2164 that is pivotably coupled to the fixed portion 2162 by a tail folding mechanism in the form of a pivot assembly 218. The tail 213 connects the movable portions 2164 of the arm assemblies 216 so that the movable portions 2164 of the arm assemblies 216 and the tail 213 collectively define a movable tail portion 217. The pivot assembly 218 includes a movable mount 218*a* supported on top surface of the movable portion 2164, a fixed mount 218*b* supported on a top surface of the fixed portion 2162, and a pin 218*c* that pivotably secures the fixed mount 218*b* to the movable mount 218*a* and facilitates pivotable movement of the movable portions 2164 of the arm assemblies 216 and the tail 213 relative to the fixed portions 2162 of the arm assemblies 216 and relative to the body 202 of the fUAV 200. The tail assembly 206 is arranged such that in a fully folded position, the movable tail portion 217 has a center of gravity that is proximal to pivot assembly 218 such that when compressive forces acting on the movable tail portion 217 from the landing pad assembly 120 are removed, gravity will enable the movable tail portion 217 to unfold naturally to the unfolded position of the movable tail portion 217 where the tail assembly 206 is fully extended lengthwise relative to the body 202 of the fUAV 200.

Figure 9:
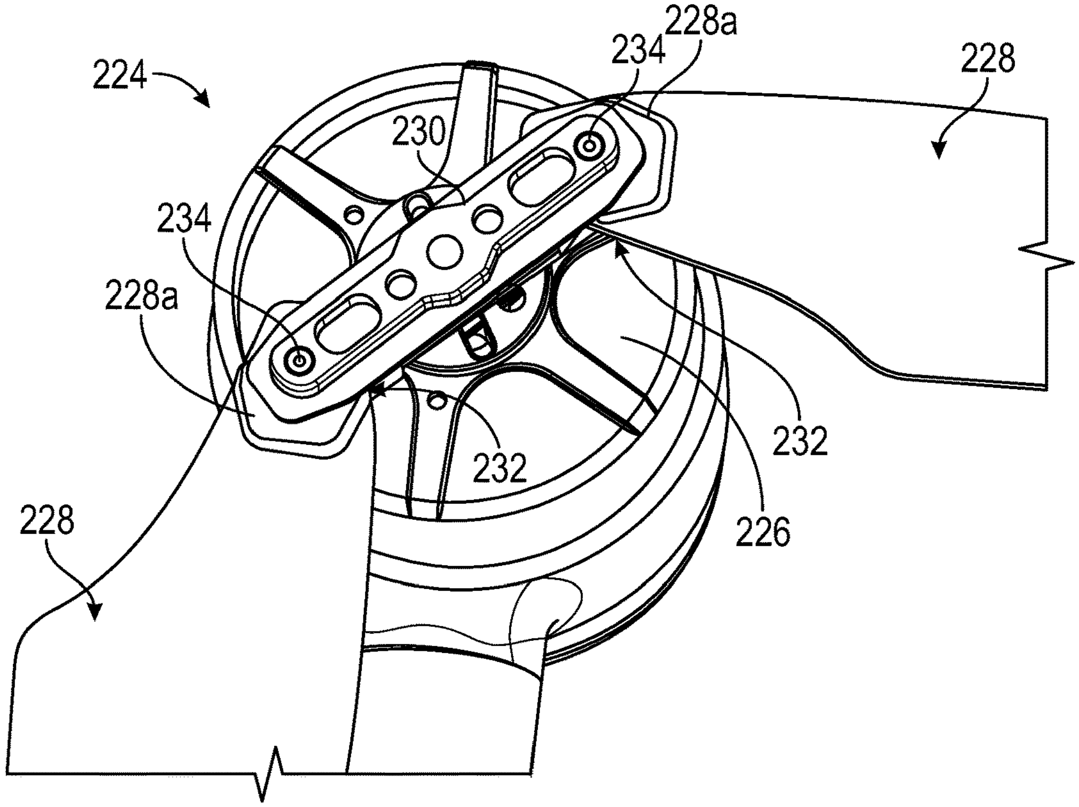
FIG. 9 is an enlarged perspective view of a portion of a vertical rotor assembly of the foldable unmanned aerial vehicle and illustrating a propeller folding mechanism.
Figure 10:
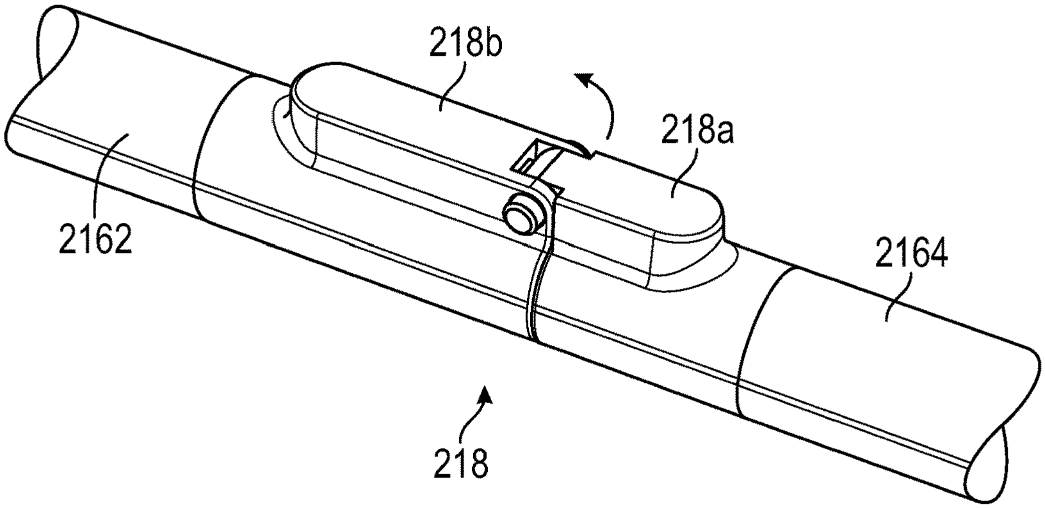
FIG. 10 is an enlarged perspective view of a tail folding mechanism of the foldable unmanned aerial vehicle.

Turning to FIGS. 3 and 9, each of the rotor assemblies 208 includes an elongated shaft 222 coupled to a bottom surface of one of the wings 204 and supports vertical rotors or rotor assemblies 224 on opposite ends thereof. Each vertical rotor assembly 224 includes a rotor motor 226 and foldable propellers 228 that are coupled to rotor motor 226 by a propeller folding mechanism is the form of a propeller mount 230. A mounting end 228*a* of each foldable propeller 228 is secured within mounting channels 232 defined on opposite ends of the propeller mount 230 and secured therein via pins 234 to enable the foldable propellers 228 to pivot relative to the propeller mount 230 between folded and unfolded positions. In the unfolded position, the foldable propellers 228 of each respective vertical rotor assembly 224 are disposed in diametrically opposed relationship (e.g., 180 degrees apart as seen in FIG. 3). In the folded position, the foldable propellers 228 are perpendicular to one another (e.g., 90 degrees apart) and can be arranged so that each pair of foldable propellers 228 of each respective vertical rotor assembly 224 is disposed in mirrored relationship with each of the other pairs of foldable propellers 228, whether about the longitudinal axis of the body, a longitudinal axis defined by the wings (e.g., perpendicular to the longitudinal axis of the body), or about one of the two imaginary diagonal planes extending through a center of the four vertical rotor assemblies 224 with each of the two imaginary diagonal planes extending through two of the four vertical rotor assemblies 224 that are on opposite lateral sides of the body and on opposite longitudinal sides of the body with respect to one another. Stated differently, each pair of the foldable propellers 228 can be arranged so that each pair of the foldable propellers 228 defines one of the four corners of an imaginary rectangle (e.g., a square) defined by the four corners of the imaginary rectangle (see FIG. 2).

With reference to FIGS. 1-7, to remove the fUAV 200 from storage within the grounding station 100, the grounding station 100 is actuated (e.g., remotely via computing device) so that upward movement of the landing assembly 120 urges the fUAV 200 upwardly and causes the hatch assembly 130 and the landing assembly 120 to open. As the landing assembly 120 opens outwardly, inward compressive forces acting on the fUAV 200 from the landing assembly 120 dissipate so that the fUAV 200, namely the folding features including one or more of the foldable propeller assemblies, the foldable wing assemblies, and/or the foldable tail assembly can unfold. In particular, the natural unfolding motion of the landing pad assembly 120 enables the passive spring-loaded folding wings 204 to smoothly unfold the movable portions 2044 of the wings 204 of fUAV 200 and enables gravity to cause the movable tail portion 217 to smoothly unfold. This unfolding is therefore fully automated and does not require structure internal to the fUAV 200 to effectuate such unfolding.

Figure 2:
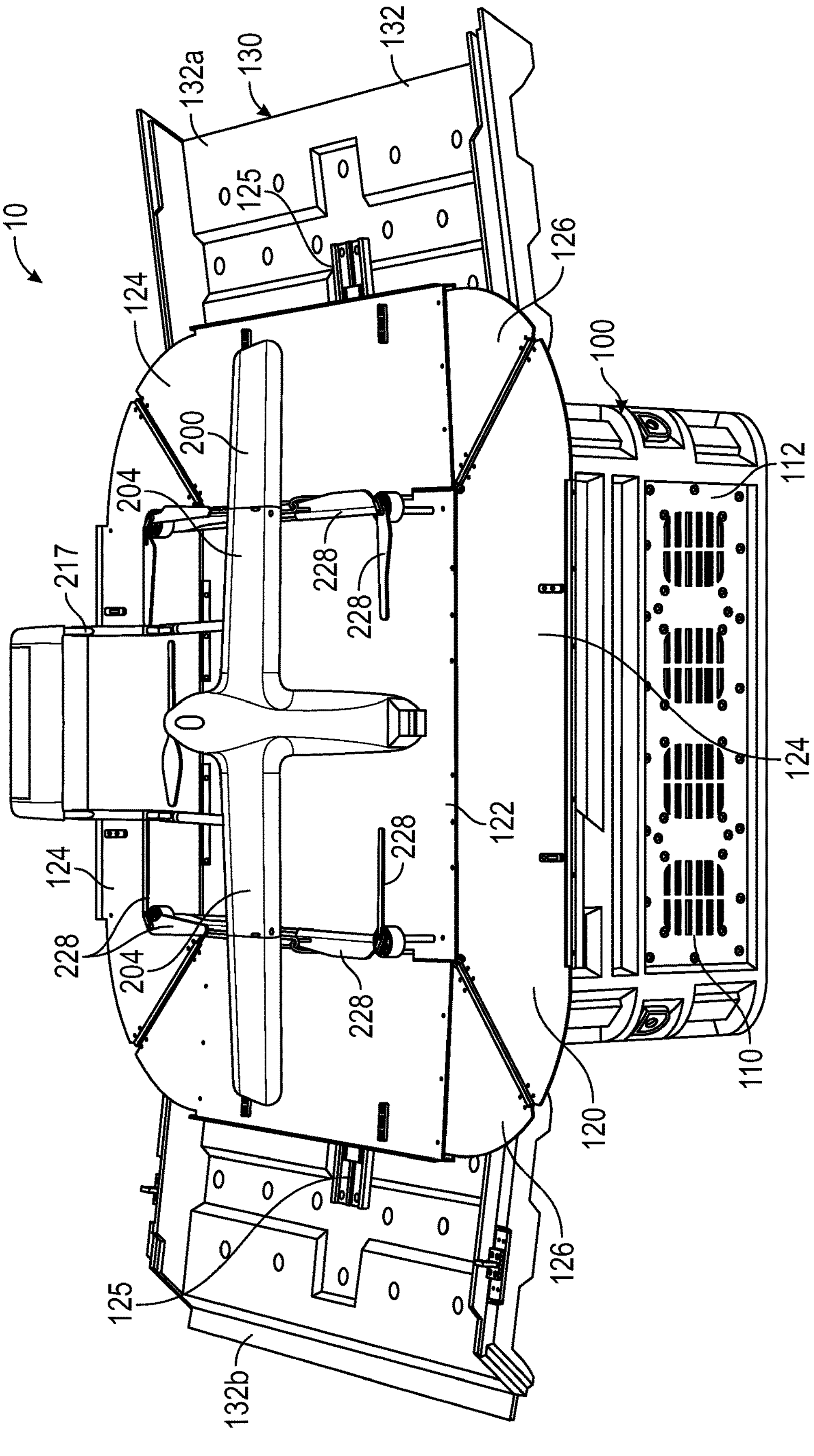
FIG. 2 is a perspective view of the unmanned aerial vehicle system illustrating the ground station and the foldable unmanned aerial vehicle in deployment positions with the ground station fully opened, the foldable unmanned aerial vehicle shown with a tail assembly and wings thereof shown in an unfolded configuration, and the foldable unmanned aerial vehicle shown with propellers of vertical rotors of the foldable unmanned aerial vehicle disposed in a folded configuration.

As seen in FIG. 2, when the ground station 100 is fully opened, the wings 204 and the tail assembly 206 are fully unfolded such that the fUAV 200 is ready for takeoff even though the propellers 228 of each of the rotor assemblies 208 remain folded. The propellers 228 remain in a folded position (e.g., approximately 90 degree apart) and in that rectangular arrangement noted above as placed by a previous closing action of the grounding station 100 around the fUAV 200. When the propellers 228 of the vertical rotor assemblies 208 are rotated to effectuate take-off of fUAV 200, the centrifugal forces caused by such rotation cause the propellers 228 to unfold to an unfolded position (e.g., approximately 180 degrees apart) so the fUAV 200 can fly as seen in FIG. 3.

Figure 4:
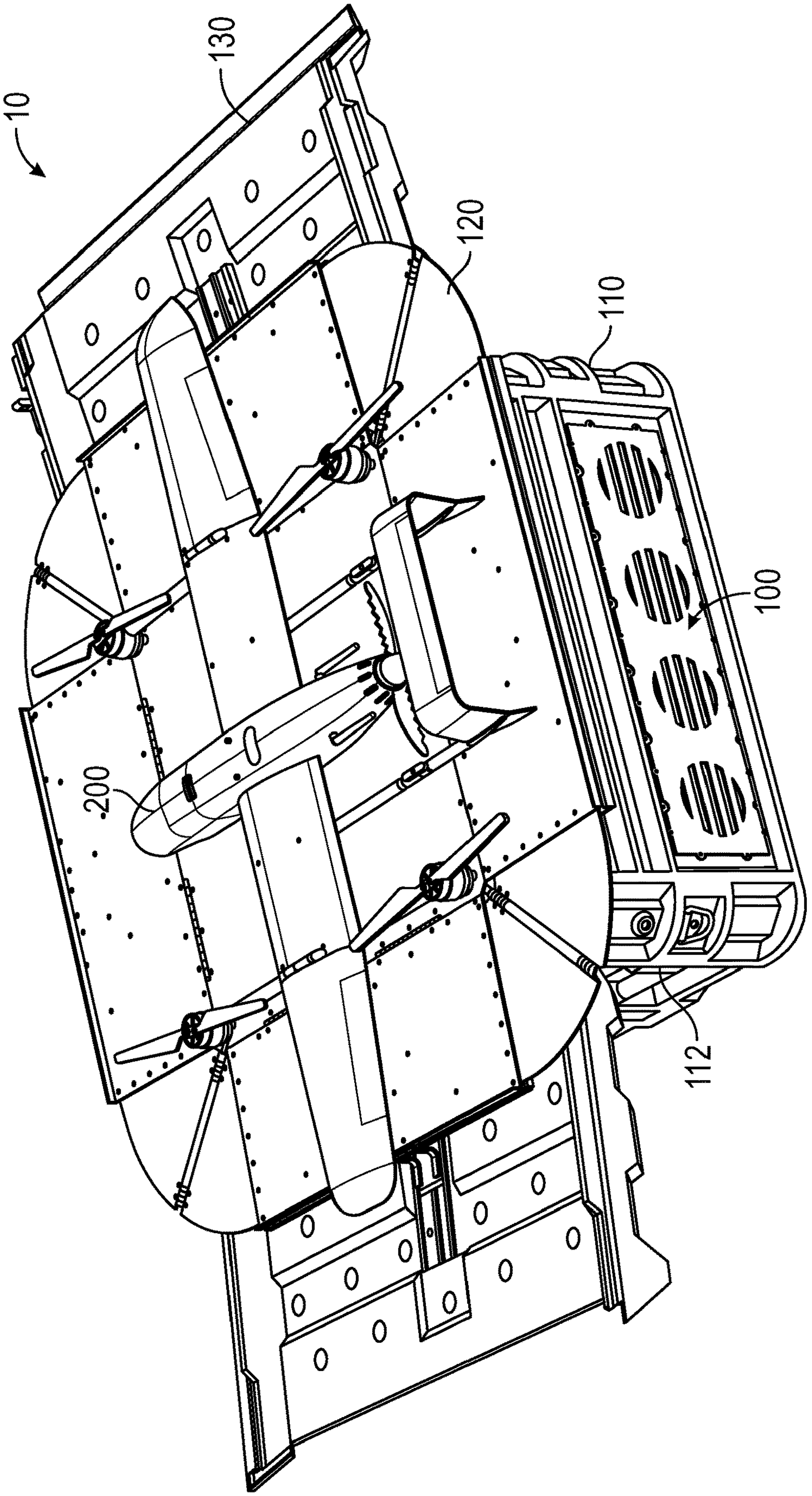
FIGS. 4-7 are progressive views illustrating the ground station folding the foldable unmanned aerial vehicle within a storage cavity of the ground station.

As seen in FIG. 4, after the fUAV 200 lands on the landing pad assembly 120 of the ground station 100 (post-flight), the wings 204, tail assembly 206, and the foldable propellers 228 of each vertical rotor assembly 224 are fully unfolded.

Figure 5:
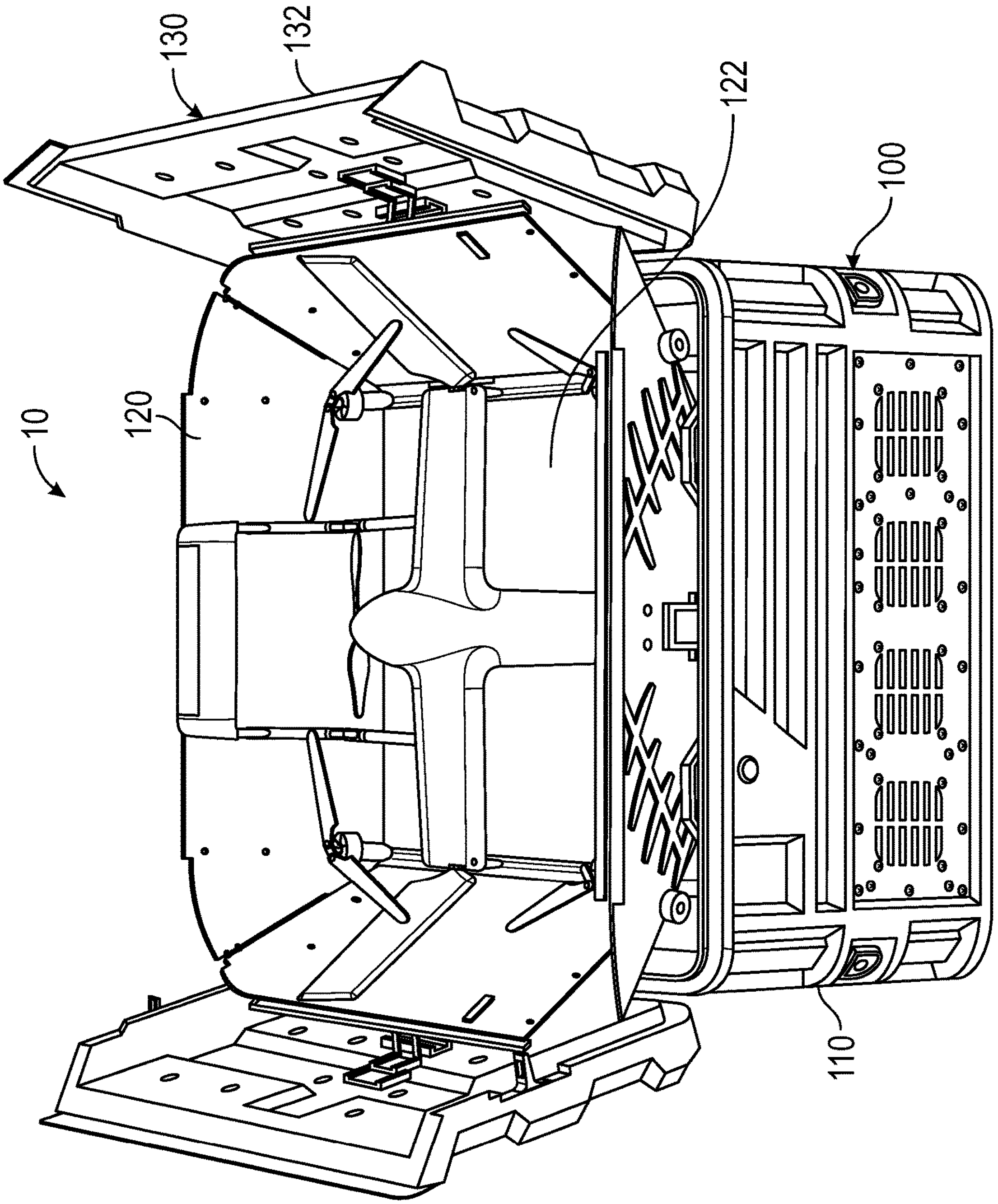
Figure 6:
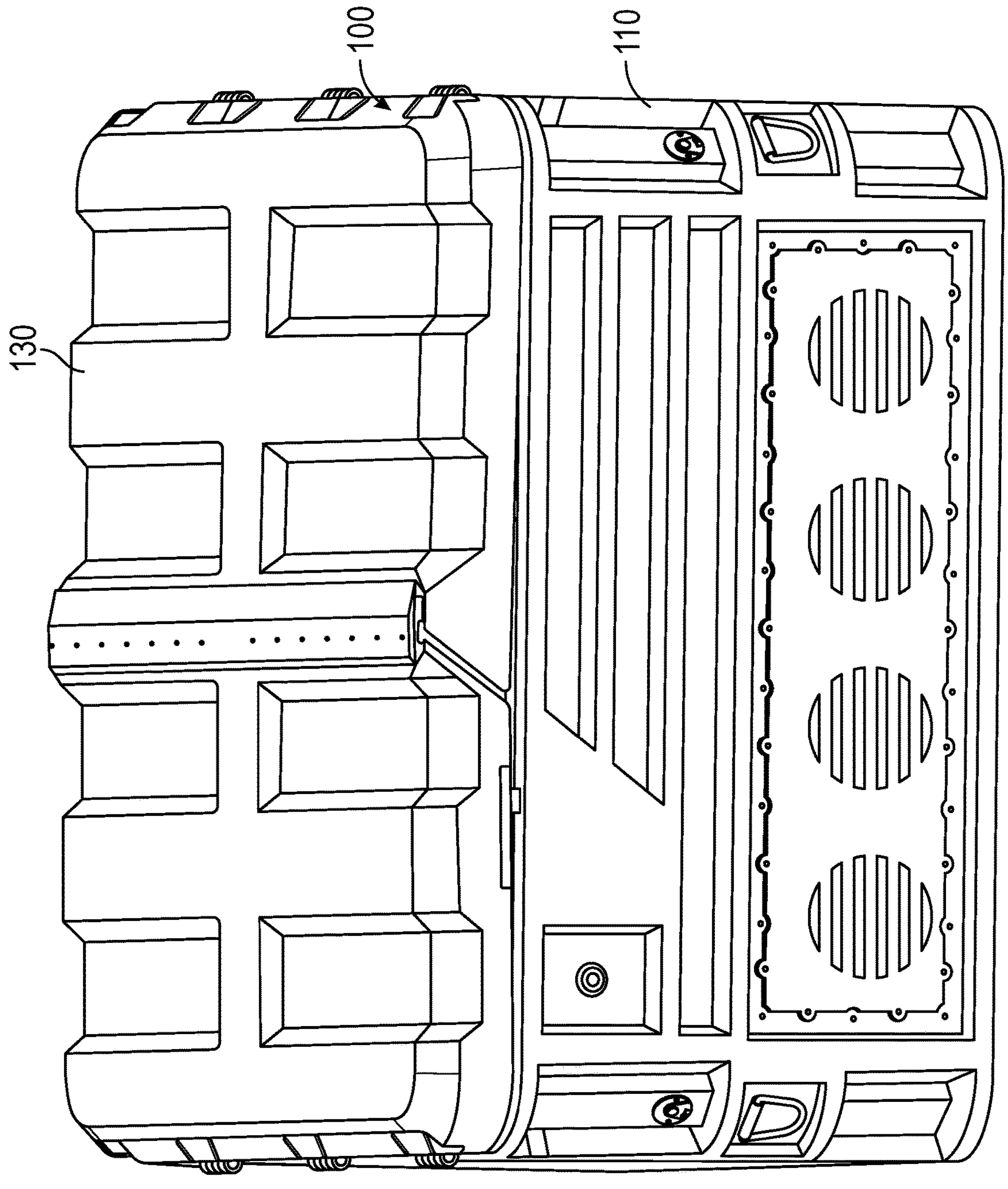
Figure 7:
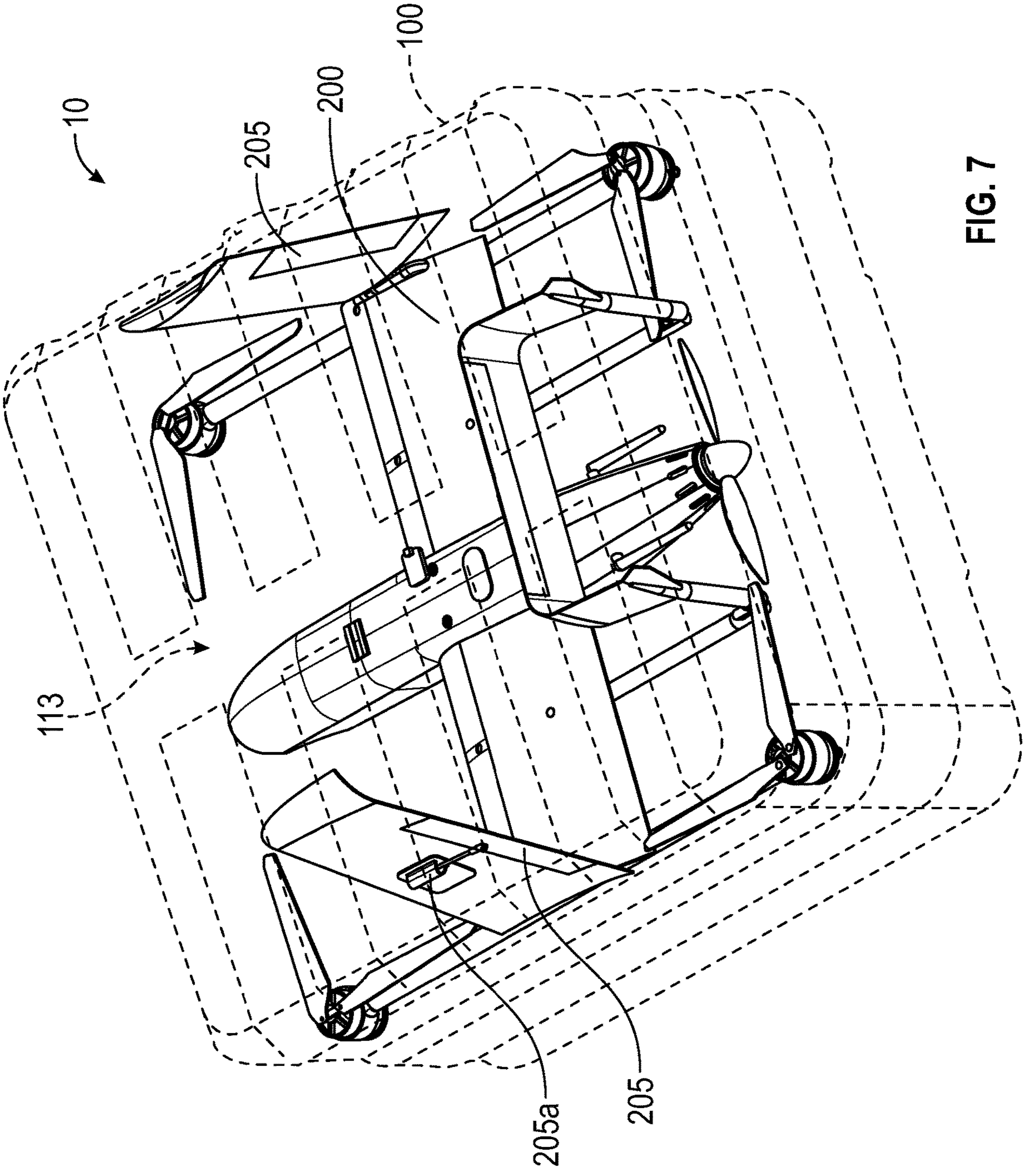

As seen in FIGS. 5-7, closing of the ground station 100, including the landing pad assembly 120, actively and automatically folds the wings 204, the tail assembly 206, and the foldable propellers 228 of each vertical rotor assembly 224, aligning them each to their respective storage or folded positions. Notably, when the landing pad assembly 120 moves downwardly during closing (e.g., via a scissor action as described for example in U.S. patent Ser. No. 11,747,832 incorporated by reference herein (see above), or via other linear motion methods), the auxiliary panels 124 naturally fold at the hinge. As auxiliary panels 124 fold inwards, corner panels 126 are forced to retract into auxiliary panels 124. Further, as the auxiliary panels 124 fold inward, the landed fUAV 200 is automatically, and passively, centered on landing pad 122.

Finally, as the landing pad 122 reaches the end of its downward travel, the hatch assembly 130 is closed, creating a weatherproof seal (see FIG. 6). Advantageously, the folding/collapsible landing pad assembly 120 provides for a large landing pad 122 that can accommodate precision landing tolerances, passively center the fUAV 200 without the need for an external centering mechanism, and can reduce the size of the landing pad 122 to the minimum required to house, charge, and deploy the fUAV 200. In turn, this enables the area ratio between the fUAV 200 and ground station 100 to be much smaller, thereby reducing weight of the system and increasing the portability of the system as a whole, namely, where the ground station system includes fUAV 200 and ground station 100.

Also advantageously, the use of a semi-independent landing pad assembly 120 provides for compatibility with the many system types. Although the landing pad 122 for an un-tethered fUAV is generally depicted, tethered use is also contemplated whereby a tether spool can be mounted on the underside of the landing pad 122. To switch the system to tethered use, the landing pad 122 is modularly replaceable with a different landing pad (e.g., one which can support tethered flights, or one which can support continuous flights via storage, charging and deployment of at least two drones inside one ground station).

The unmanned aerial vehicle system 10 may be in the form of a VTOL/fixed wing drone-in-a-box, and in which the normal operation of the ground station 100 provides the added features lacking in prior technology. Specifically, an opening and/or closing motion of the ground station 100 provides an automated control external to multiple components of the fUAV 200 (e.g., wings, tail, and propellers of vertical rotors), and an automatic control external to the fUAV 200 for readying the fUAV 200 for storage and for preparing for flight. Indeed, the same motion of the ground station 100 provides an automated active method for folding propellers of the vertical rotors into their storage or folded position. In sum, the union of the fUAV 200 with passively actuated components and the automated ground station 100 provide a fully automated folding of the wings, tail, and/or propellers of the vertical rotors of the fUAV 200, without any additional electronics or controls on board the vehicle. As a result, the fUAV 200 provides longer flight time and greater range while the unmanned aerial vehicle system 10 enables the fUAV 200 to be fully automatically readied for storage.

As can be appreciated, the disclosed unmanned aerial vehicle system 10 including the ground station 100 and/or fUAV 200 can be controlled via any number of computing devices and/or servers operatively coupled thereto, either directly and/or directly for effectuating any of the disclosed functions of the unmanned aerial vehicle system 10 including, for instance, the opening and/or closing of the ground station 100 for enabling the fUAV 200 to automatically fold and/or unfold, and/or for causing the fUAV 200 to fly and/or land by, for example, selectively actuating the vertical rotors.

Further aspects of the present disclosure are provided by the subject matter of the following clauses.

1. An unmanned aerial vehicle system includes an unmanned aerial vehicle and a ground station. The unmanned aerial vehicle is configured to fold from a first position in which the unmanned aerial vehicle defines a first expanse for flying to a second position in which the unmanned aerial vehicle defines a second expanse that is smaller than the first expanse for facilitating storage of the unmanned aerial vehicle. The ground station includes a box assembly and a landing pad assembly. The box assembly defines a storage cavity configured to store the unmanned aerial vehicle when the unmanned aerial vehicle is disposed in the second position. The first expanse of the unmanned aerial vehicle is larger than the storage cavity can accommodate. The landing pad assembly is movably coupled to the box assembly. The landing pad assembly is movable in a first direction to cause the unmanned aerial vehicle to fold into the storage cavity for storing the unmanned aerial vehicle within the box assembly.
2. The unmanned aerial vehicle system of the preceding clause, wherein the landing assembly is movable in a second direction to cause the unmanned aerial vehicle to unfold from the second position to the first position for enabling the unmanned aerial vehicle to deploy from the landing pad assembly.
3. The unmanned aerial vehicle system of any of the preceding clauses, wherein the landing pad assembly is autonomously actuatable to cause the landing pad assembly to move relative to the box assembly.
4. The unmanned aerial vehicle system of any of the preceding clauses, wherein the unmanned aerial vehicle includes a body defining a longitudinal axis, wings extending from the body in a direction transverse to the longitudinal axis of the body, a tail assembly disposed proximal to the body, and rotor assemblies coupled to the wings.
5. The unmanned aerial vehicle system of any of the preceding clauses, wherein each rotor assembly includes a vertical rotor assembly having at least two propellers.
6. The unmanned aerial vehicle system of any of the preceding clauses, wherein at least one of the wings is foldable toward and away from the longitudinal axis of the body in response to movement of the landing pad assembly.
7. The unmanned aerial vehicle system of any of the preceding clauses, wherein the tail assembly is moveable along the longitudinal axis of the body in response to movement of the landing pad assembly.
8. The unmanned aerial vehicle system of any of the preceding clauses, wherein at least one of the at least two propellers is movable toward the other of the at least two propellers in response to movement of the landing pad assembly to change an angular distance between the at least two propellers.
9. The unmanned aerial vehicle system of any of the preceding clauses, wherein in response to movement of the landing pad assembly:
   at least one of the wings is foldable toward and away from the longitudinal axis of the body,
   the tail assembly is moveable along the longitudinal axis of the body, and/or
   at least one of the at least two propellers is movable toward the other of the at least two propellers to change an angular distance between the at least two propellers.
10. The unmanned aerial vehicle system of any of the preceding clauses, wherein the at least one wing includes a spring assembly that urges the at least one wing away from the longitudinal axis of the body.
11. The unmanned aerial vehicle system of any of the preceding clauses, wherein the tail assembly includes a first arm assembly, a second arm assembly, and a tail the connects the first arm assembly to the second arm assembly.
12. The unmanned aerial vehicle system of any of the preceding clauses, wherein the first arm assembly and the second arm assembly each include a fixed portion and a movable portion that is pivotably coupled to the fixed portion.
13. The unmanned aerial vehicle system of any of the preceding clauses, wherein the fixed portion is pinned to the movable portion.
14. The unmanned aerial vehicle system of any of the preceding clauses, wherein the body includes a propeller that rotates about the longitudinal axis of the body.
15. The unmanned aerial vehicle system of any of the preceding clauses, wherein the grounding station further includes doors that are pivotably coupled to the box assembly, the doors moveable between open and closed position.
16. The unmanned aerial vehicle system of any of the preceding clauses, wherein the ground station is configured to enclose the unmanned aerial vehicle within the storage cavity when the doors are disposed in the closed position.
17. The unmanned aerial vehicle system of any of the preceding clauses, wherein at least one of the wings includes a movable portion and a fixed portion, the fixed portion coupled to the body, the movable portion coupled to the fixed portion.
18. The unmanned aerial vehicle system of any of the preceding clauses, wherein the movable portion is foldable relative to the fixed portion and toward and away from the longitudinal axis of the body.
19. The unmanned aerial vehicle system of any of the preceding clauses, wherein a spring assembly couples the movable portion to the fixed portion to urge the movable portion away from the longitudinal axis of the body.
20. The unmanned aerial vehicle system of any of the preceding clauses, wherein the spring assembly includes a torsion spring.

It should be understood that the disclosed structure can include any suitable mechanical, electrical, and/or chemical components for operating the disclosed system or components thereof. For instance, such electrical components can include, for example, any suitable electrical and/or electromechanical, and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud-computing-based storage. In various aspects, the storage and/or memory device is a combination of devices such as those disclosed herein.

In various aspects, the memory can be random access memory, read-only memory, magnetic disk memory, solid state memory, optical disc memory, and/or another type of memory. In various aspects, the memory can be separate from the controller and can communicate with the processor through communication buses of a circuit board and/or through communication cables such as serial ATA cables or other types of cables. The memory includes computer-readable instructions that are executable by the processor to operate the controller. In various aspects, the controller may include a wireless network interface to communicate with other computers or a server. In aspects, a storage device may be used for storing data. In various aspects, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In aspects where the controller is remote, it is contemplated that the controller may be accessible by, and connected to, multiple structures and/or components of the disclosed system.

The term "application" may include a computer program designed to perform particular functions, tasks, or activities for the benefit of a user. Application may refer to, for example, software running locally or remotely, as a standalone program or in a web browser, or other software which would be understood by one skilled in the art to be an application. An application may run on the disclosed controllers or on a user device, including for example, on a mobile device, an IOT device, or a server system.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

As can be appreciated, securement of any of the components of the disclosed systems can be effectuated using known securement techniques such welding, crimping, gluing, fastening, etc.

The phrases "in an aspect," "in aspects," "in various aspects," "in some aspects," or "in other aspects" may each refer to one or more of the same or different aspects in accordance with the present disclosure. Similarly, the phrases "in an aspect," "in aspects," "in various aspects," "in some aspects," or "in other aspects" may each refer to one or more of the same or different aspects in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various aspects of the present disclosure may include all, some, or none of the enumerated advantages and/or other advantages not specifically enumerated above.

The aspects disclosed herein are examples of the disclosure and may be embodied in various forms. For instance, although certain aspects herein are described as separate aspects, each of the aspects herein may be combined with one or more of the other aspects herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and illustrated in the accompanying figures are non-limiting exemplary aspects, and that the description, disclosure, and figures should be construed merely as exemplary of particular aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. An unmanned aerial vehicle system, comprising:

an unmanned aerial vehicle configured to fold from a first position in which the unmanned aerial vehicle defines a first expanse for flying to a second position in which the unmanned aerial vehicle defines a second expanse that is smaller than the first expanse for facilitating storage of the unmanned aerial vehicle; and a ground station including:

a box assembly defining a storage cavity configured to store the unmanned aerial vehicle when the unmanned aerial vehicle is disposed in the second position, the first expanse of the unmanned aerial vehicle being larger than the storage cavity can accommodate; and a landing pad assembly movably coupled to the box assembly, the landing pad assembly being movable in a first direction to cause the unmanned aerial vehicle to fold into the storage cavity for storing the unmanned aerial vehicle within the box assembly.

2. The unmanned aerial vehicle system of claim 1, wherein the landing assembly is movable in a second direction to cause the unmanned aerial vehicle to unfold from the second position to the first position for enabling the unmanned aerial vehicle to deploy from the landing pad assembly.

3. The unmanned aerial vehicle system of claim 1, wherein the landing pad assembly is autonomously actuatable to cause the landing pad assembly to move relative to the box assembly.

4. The unmanned aerial vehicle system of claim 1, wherein the unmanned aerial vehicle includes a body defining a longitudinal axis, wings extending from the body in a direction transverse to the longitudinal axis of the body, a tail assembly disposed proximal to the body, and rotor assemblies coupled to the wings.

5. The unmanned aerial vehicle system of claim 4, wherein each rotor assembly includes a vertical rotor assembly having at least two propellers.

6. The unmanned aerial vehicle system of claim 4, wherein at least one of the wings is foldable toward and away from the longitudinal axis of the body in response to movement of the landing pad assembly.

7. The unmanned aerial vehicle system of claim 4, wherein the tail assembly is moveable along the longitudinal axis of the body in response to movement of the landing pad assembly.

8. The unmanned aerial vehicle system of claim 5, wherein at least one of the at least two propellers is movable toward the other of the at least two propellers in response to movement of the landing pad assembly to change an angular distance between the at least two propellers.

9. The unmanned aerial vehicle system of claim 5, wherein in response to movement of the landing pad assembly:

at least one of the wings is foldable toward and away from the longitudinal axis of the body, the tail assembly is moveable along the longitudinal axis of the body, and/or at least one of the at least two propellers is movable toward the other of the at least two propellers to change an angular distance between the at least two propellers.

10. The unmanned aerial vehicle system of claim 9, wherein the at least one wing includes a spring assembly that urges the at least one wing away from the longitudinal axis of the body.

11. The unmanned aerial vehicle system of claim 9, wherein the tail assembly includes a first arm assembly, a second arm assembly, and a tail the connects the first arm assembly to the second arm assembly.

12. The unmanned aerial vehicle system of claim 11, wherein the first arm assembly and the second arm assembly each include a fixed portion and a movable portion that is pivotably coupled to the fixed portion.

13. The unmanned aerial vehicle system of claim 12, wherein the fixed portion is pinned to the movable portion.

14. The unmanned aerial vehicle system of claim 4, wherein the body includes a propeller that rotates about the longitudinal axis of the body.

15. The unmanned aerial vehicle system of claim 1, wherein the grounding station further includes doors that are pivotably coupled to the box assembly, the doors moveable between open and closed position.

16. The unmanned aerial vehicle system of claim 15, wherein the ground station is configured to enclose the unmanned aerial vehicle within the storage cavity when the doors are disposed in the closed position.

17. The unmanned aerial vehicle system of claim 4, wherein at least one of the wings includes a movable portion and a fixed portion, the fixed portion coupled to the body, the movable portion coupled to the fixed portion.

18. The unmanned aerial vehicle system of claim 17, wherein the movable portion is foldable relative to the fixed portion and toward and away from the longitudinal axis of the body.

19. The unmanned aerial vehicle system of claim 18, wherein a spring assembly couples the movable portion to the fixed portion to urge the movable portion away from the longitudinal axis of the body.

20. The unmanned aerial vehicle system of claim 19, wherein the spring assembly includes a torsion spring.

* * * * *